United States Patent
Sasaki et al.

(10) Patent No.: US 7,259,347 B2
(45) Date of Patent: *Aug. 21, 2007

(54) ELECTRIC DISCHARGE MACHINE THAT CALCULATES AND DISPLAYS THE MACHINING TIME

(75) Inventors: Rika Sasaki, Tokyo (JP); Tomoko Sendai, Tokyo (JP); Hidetaka Katougi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 207 days.

This patent is subject to a terminal disclaimer.

(21) Appl. No.: 10/493,391

(22) PCT Filed: May 20, 2003

(86) PCT No.: PCT/JP03/06287

§ 371 (c)(1),
(2), (4) Date: Apr. 22, 2004

(87) PCT Pub. No.: WO2004/103625

PCT Pub. Date: Dec. 2, 2004

(65) Prior Publication Data

US 2006/0065638 A1    Mar. 30, 2006

(51) Int. Cl.
B23H 7/20    (2006.01)
G06F 19/00    (2006.01)

(52) U.S. Cl. .................... 219/69.13; 700/162

(58) Field of Classification Search ............. 219/69.13, 219/69.16, 69.17; 700/162
See application file for complete search history.

(56) References Cited

U.S. PATENT DOCUMENTS

| 4,980,532 | A |   | 12/1990 | Morishita |         |
|-----------|---|---|---------|-----------|---------|
| 5,514,941 | A | * | 5/1996  | Kita      | 700/174 |
| 6,907,311 | B2| * | 6/2005  | Sendai et al. | 700/162 |

FOREIGN PATENT DOCUMENTS

| JP | 58-114828 A  |   | 7/1983  |           |
|----|--------------|---|---------|-----------|
| JP | 62-173142 A  |   | 7/1987  |           |
| JP | 2-100822 A   |   | 4/1990  |           |
| JP | 4-105823 A   | * | 4/1992  | 219/69.13 |
| JP | 6-297250 A   |   | 10/1994 |           |
| JP | 6-320344 A   | * | 11/1994 |           |
| JP | 8-25148 A    |   | 1/1996  |           |
| JP | 9-253943 A   |   | 9/1997  |           |
| WO | WO 01/81035 A1 | | 11/2001 |           |

OTHER PUBLICATIONS

International Search Report date Sep. 2, 2003.

* cited by examiner

Primary Examiner—Geoffrey S. Evans
(74) Attorney, Agent, or Firm—Sughrue Mion, PLLC

(57) ABSTRACT

A change in machining volume is calculated using a shape of the electrode and a shape of the workpiece expressed by three-dimensional models and machining condition data and the machining time is calculated according to actual machining status based on the calculated change in machining volume.

6 Claims, 21 Drawing Sheets

FIG.3

| MACHINING DEPTH | MACHINING AREA |
|---|---|
| -0.25 | 30.48522 |
| -0.5 | 32.76448 |
| -0.75 | 35.36936 |
| -1 | 37.97424 |
| -1.25 | 40.25351 |
| -1.5 | 42.69558 |
| -1.75 | 45.46327 |
| -2 | 48.88217 |
| -2.25 | 51.48705 |
| -2.5 | 55.06876 |

FIG.4

| MACHINING CONDITIONS | MACHINING CONDITIONS | | | | MACHINING RATE |
|---|---|---|---|---|---|
| | MACHINING CIRCUIT | DISCHARGE CURRENT | IDLE PERIOD | OSCILLATING RADIUS... | |
| 1 | SIR1 | IP1 | OFF1 | R1... | K1 |
| 2 | SIR2 | IP2 | OFF2 | R2... | K2 |
| 3 | SIR3 | IP3 | OFF3 | R3... | K3 |
| 4 | SIR4 | IP4 | OFF4 | R4... | K4 |
| 5 | SIR5 | IP5 | OFF5 | R5... | K5 |
| 6 | SIR6 | IP6 | OFF6 | R6... | K6 |

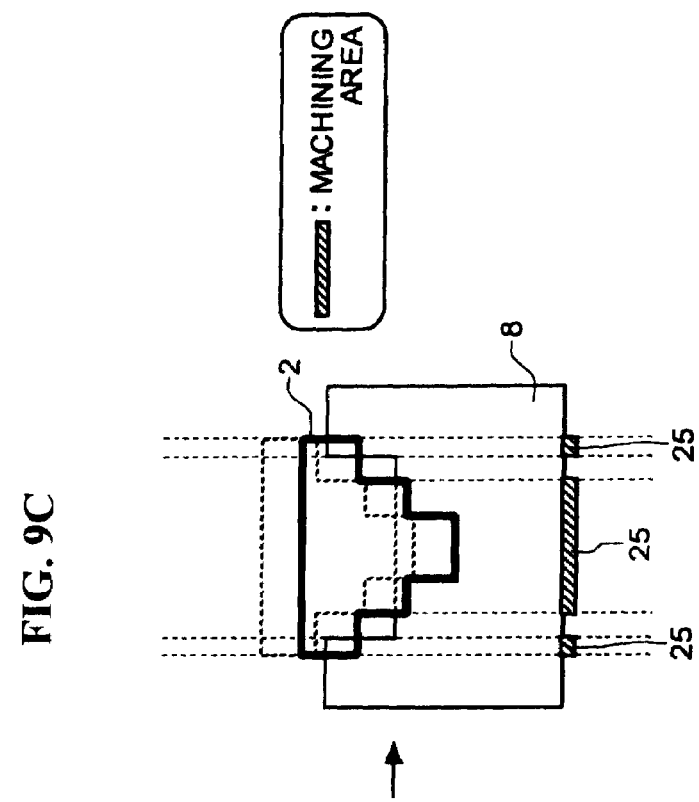
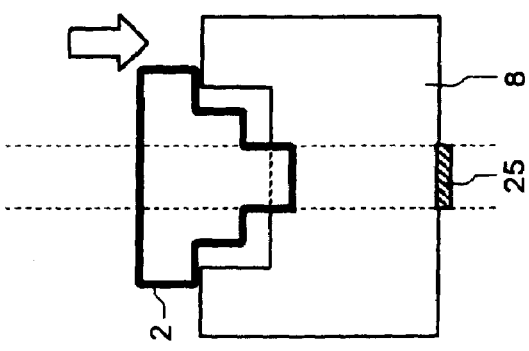
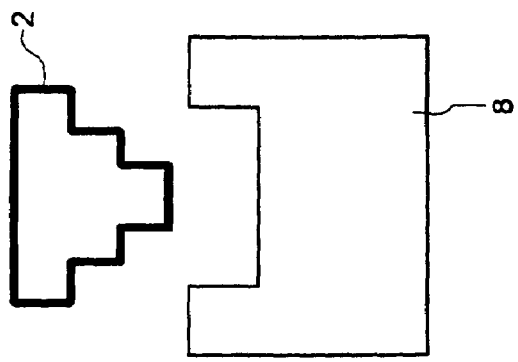

FIG.16

| SHAPE CHARACTERISTIC | SHAPE CHARACTERISTIC FACTOR |
|---|---|
| C1 | Cm1 |
| C2 | Cm2 |
| C3 | Cm3 |
| C4 | Cm4 |
| C5 | Cm5 |
| C6 | Cm6 |

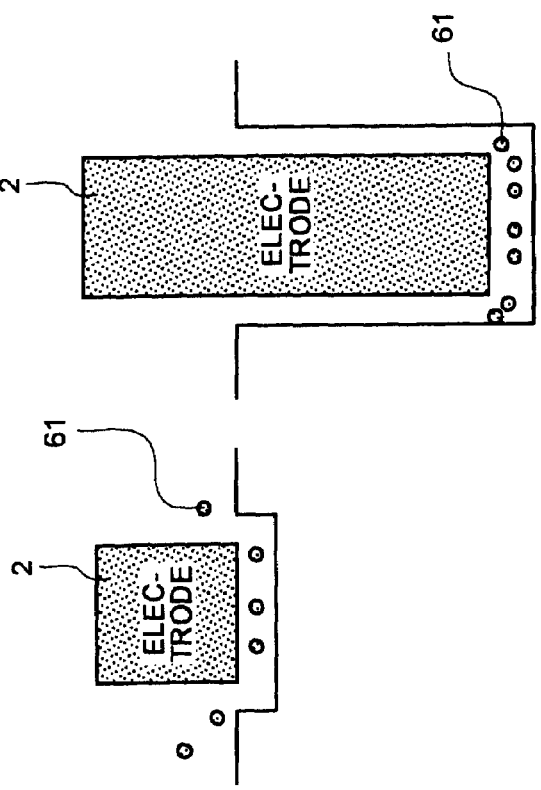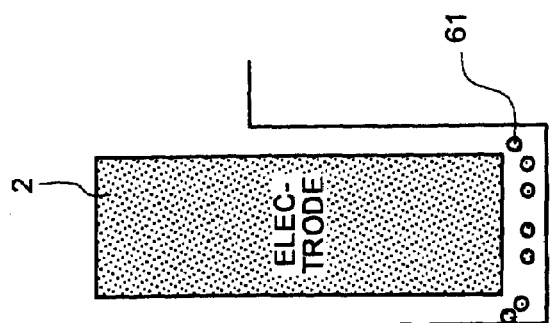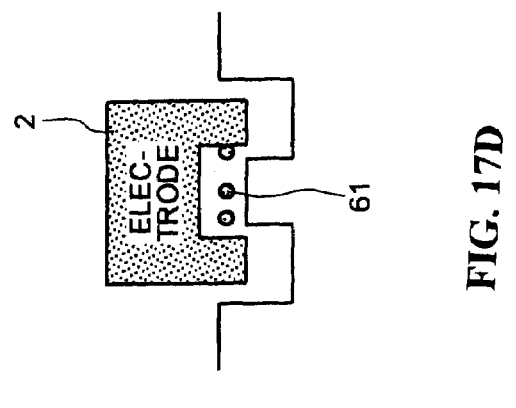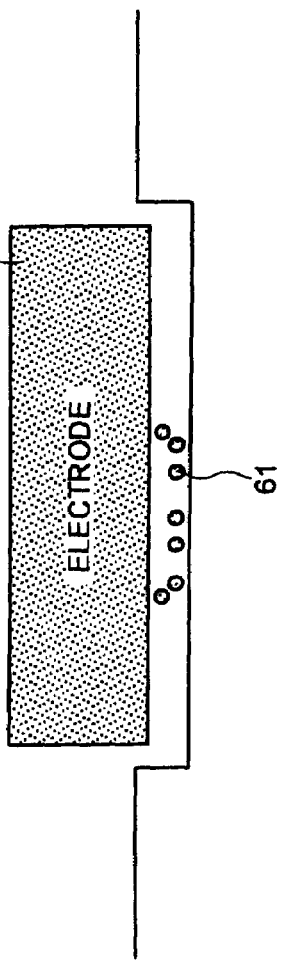

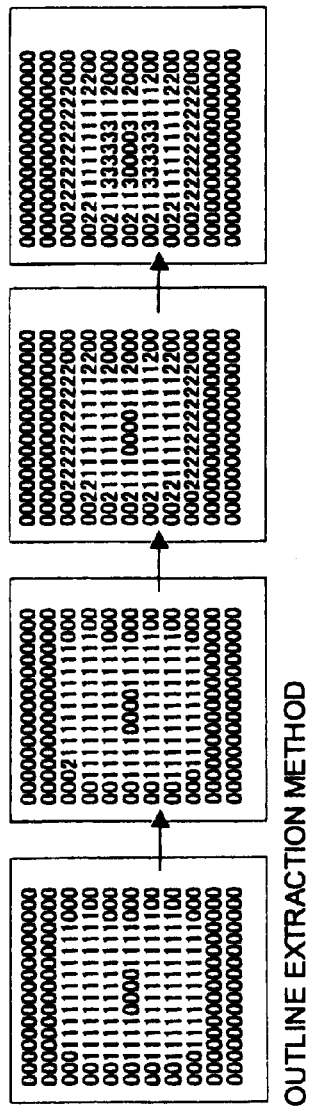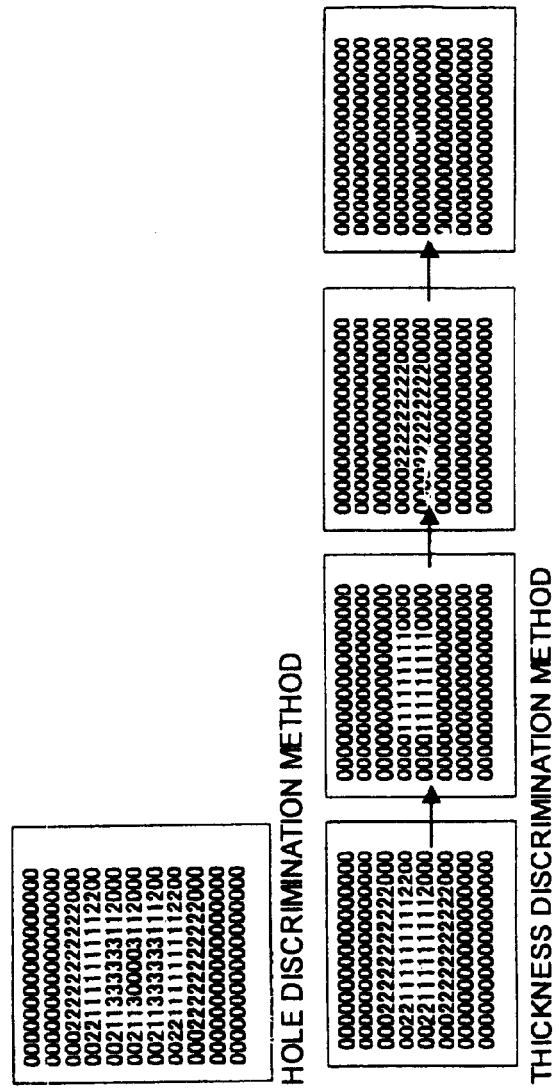
FIG. 21A  OUTLINE EXTRACTION METHOD
FIG. 21B  HOLE DISCRIMINATION METHOD
FIG. 21C  THICKNESS DISCRIMINATION METHOD

ELECTRIC DISCHARGE MACHINE THAT CALCULATES AND DISPLAYS THE MACHINING TIME

TECHNICAL FIELD

The present invention relates to an electric discharge machining apparatus. More specifically, the present invention relates to an electric discharge machining apparatus that can estimate the machining time accurately.

BACKGROUND ART

Some electric discharge machining apparatuses are configured to estimate the machining time. These electric discharge machining apparatus include an electrode, a main shaft, a machining time estimation device that estimates the machining time, a power supply, and a numerical controller which drives and controls the electric discharge machining apparatus.

The machining time estimation device includes, for example, an input section that receives user's required specifications, a machining amount calculation section that calculates an amount of the workpiece that is to be removed by machining (hereinafter, "removal amount"), a machining time calculation section that calculates the machining time based on the input required specifications, a machining time data section that stores machining rate data necessary to calculate the machining time, and an output section that outputs the machining time calculated.

The estimation of the machining time is performed as follows. A user inputs the required specifications. The required specifications are, for example, electrode size, workpiece size, machining depth, and machining conditions depending upon how the workpiece is to be machined. The electrode size and the workpiece size are expressed by, for example, "x size: −5 to 5, y size: −10 to 10". If the entire electrode is going to be inserted in the workpiece, the workpiece size does not directly affect the machining time; therefore, the workpiece size is often omitted from the specifications.

The machining amount calculation section receives the required specifications from the input section and calculates the removal amount from the electrode size and the workpiece size.

The machining time calculation section generates machining time sequences from starting conditions to finishing conditions estimated relative to the required specifications based on pieces of calculation data thus obtained and machining rate data on a machining rate per machining amount that is stored in the machining time data section in advance, and outputs the machining time sequences to a display device such as a CRT.

Japanese Patent Application Laid-Open No. 6-297250 discloses an electric discharge machining apparatus which estimates the machining time by correcting the machining rate according to the machining depth.

Japanese Patent Application Laid-Open No. 2-100822 discloses an electric discharge machining apparatus in which a shape of the electrode is input and the machining time is corrected from the shape.

However, most electrodes are of three-dimensional, complex shape. Therefore, as the machining progresses, a machining area varies with the shape of the electrode. Therefore, the machining conditions vary such as changes in a discharge state according to machining dusts deposited between the electrode and the workpiece as the machining progresses and in the machining area. As a result, the difference between the estimated machining time and the actual machining time disadvantageously grows and the accurate estimation of the machining time cannot be disadvantageously ensured only by changing the machining rate according to the machining depth as explained in the conventional documents.

Meanwhile, in the method of inputting the shape of the electrode, the shape can be input if the shape is simple such as a prism; however, the shape cannot be input if the electrode has a complex shape. As a result, the machining time cannot be estimated for complex-shaped electrodes.

Even if the electrode is simple in shape, the shape of the electrode is influenced by the subjectivity of the user who inputs the data and machining uniformity cannot be maintained. If the shape of the electrode is deviated from the characteristics of the shape input in advance even slightly, the deviation is not reflected in the machining time.

Moreover, the workpiece is often pre-machined by cutting or the like. In addition, one workpiece is often continuously machined using a plurality of electrodes having different shapes to thereby obtain the final shape of the workpiece. If the workpiece is, for example, a cellular phone workpiece, the workpiece is subjected to premachining by cutting and then to discharge machining using as many as about 20 types of electrodes having different shapes, thereby obtaining the final shape of the workpiece. As a result, the machining amount cannot be grasped only by recognizing the simple electrode shape, and the accurate machining time cannot be disadvantageously estimated.

DISCLOSURE OF THE INVENTION

It is an object of the present invention to solve at least the problems in the conventional technology.

An electric discharge machining apparatus according to the present invention includes an input unit that receives input of data about three-dimensional shape of an electrode, three-dimensional shape of a workpiece, and machining conditions; a machining volume calculation unit that calculates, based on the data about the shape of the electrode, the shape of the workpiece, and machining conditions, a machining volume that changes as machining of the workpiece by the electrode progresses; a machining time calculation unit that calculates, based on the machining volume calculated by the machining volume calculation unit, a machining time that is a time required to complete the machining of the workpiece by the electrode; and a display unit that displays the machining time calculated by the machining time calculation unit.

An electric discharge machining apparatus includes an input unit that receives input of a machining area that changes as machining progresses and machining condition data; a machining volume calculating unit that calculates a machining volume based on the machining area input; a machining time calculating unit that calculates a machining time based on the machining volume calculated; and a display unit that displays the machining time calculated.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 3 is an example of contents of a machining area data section;

FIG. 4 is an example of contents of a machining time data section;

FIGS. 9A, 9B and 9C are views to explain machining progress;

FIG. 16 is an example of contents of a shape characteristic data section;

FIGS. 17A, 17B, 17C and 17D are longitudinal sectional views of electrodes;

FIG. 21 is to explain a method for extracting electrode shape characteristics.

BEST MODE FOR CARRYING OUT THE INVENTION

Exemplary embodiments of the present invention will be explained hereinafter with reference to the accompanying drawings. It should be noted that the present invention is not limited to the following embodiments and changes and modifications can be appropriately made to the invention within the scope of the present invention. In addition, for facilitating understanding, scales of respective members differ in the accompanying drawings.

Figure 1:
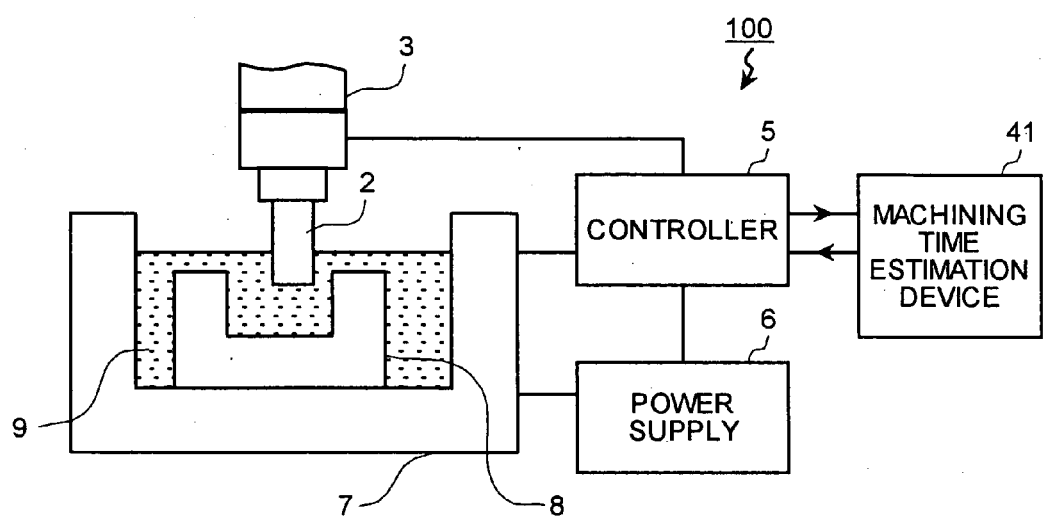
FIG. 1 is a schematic block diagram of an electric discharge machining apparatus according to a first embodiment of the present invention.

FIG. 1 is a block diagram of an electric discharge machining apparatus 100 according to a first embodiment of the present invention. The electric discharge machining apparatus 100 includes an electrode 2, a main shaft 3 serving as a head of the electric discharge machining apparatus 100, a machining time estimation device 41, a controller 5 which appropriately drives and controls a movement of the main shaft based on machining time set by the machining time estimation device 41, and a power supply 6.

The electrode 2 and a workpiece 8 are arranged to face each other while they are dipped in a machining solution 9 in a machining bath 7, and a predetermined pulse current is applied to the electrode 2 and the workpiece 8 from the power supply 6. By applying the current, intermittent discharge occurs to a machining gap between the electrode 2 and the workpiece 8 and the workpiece 8 is machined by the discharge.

Figure 2:
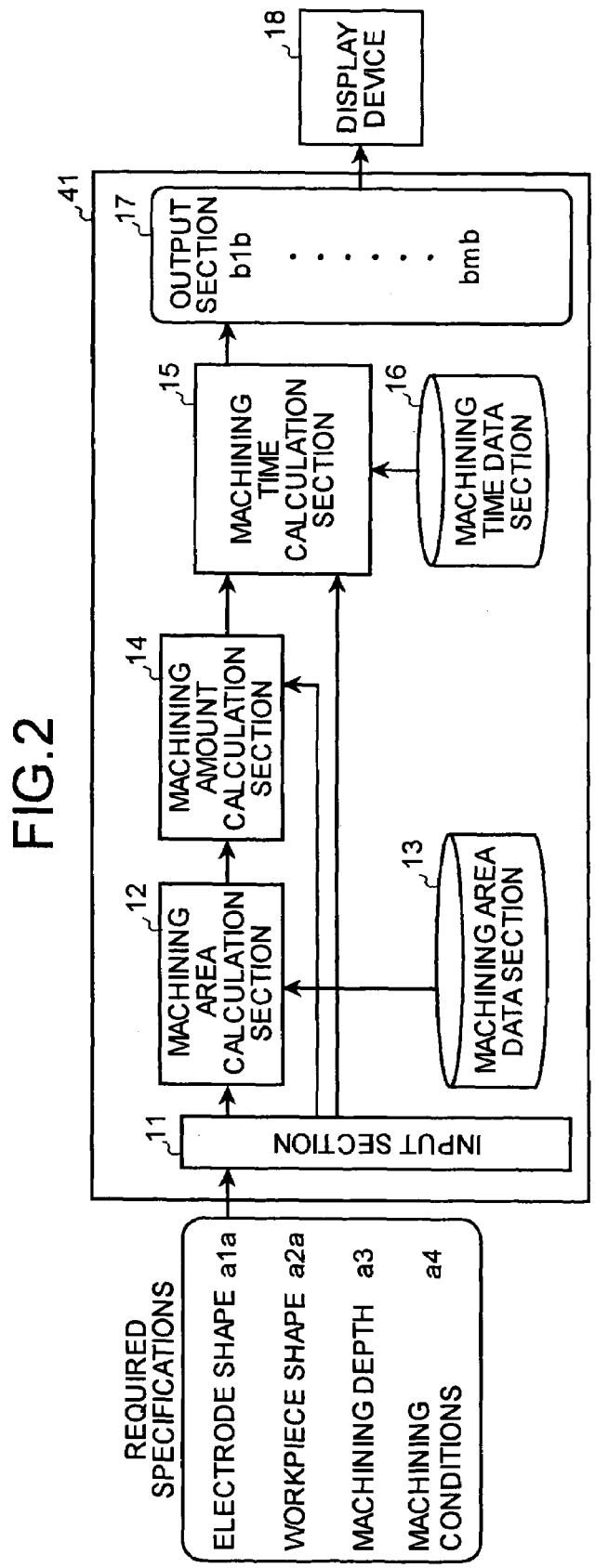
FIG. 2 is a block diagram of a machining time estimation device in the first embodiment.

FIG. 2 is a block diagram of the machining time estimation device 41. The machining time estimation device 41 includes an input section 11 which receives required specifications from a user, a machining area calculation section 12 which calculates a change in machining area following the progress of the discharge machining, a machining area data section 13 which stores machining depths and machining areas that suit to the required specifications, a machining amount calculation section 14 which calculates a change in a machining volume that is a change in a machining amount removed from the workpiece 8 by the discharge machining based on the change in machining area obtained by the machining area calculation section 12, a machining time calculation section 15 which operates machining time required as discharge time based on the change in machining volume obtained by the machining amount calculation section 14 and machining rate data per machining amount, a machining time data section 16 which stores the machining rate data per machining amount necessary to calculate the machining time in the machining time calculation section 15, and an output section 17 which outputs the machining time calculated by the machining time calculation section 15. A display device 18 which displays data output from the output section 17 is connected to the output section 17.

The machining area data section 13 stores machining depths and machining areas corresponding to the machining depths in a data table shown in, for example, FIG. 3. The machining time data section 16 stores detailed machining conditions and machining rates according to the required specifications in pairs in a data table shown in, for example, FIG. 4. The machining conditions include, for example, a machining circuit, a discharge current, an idle period, and an oscillation radius as shown in FIG. 4.

Figure 5:
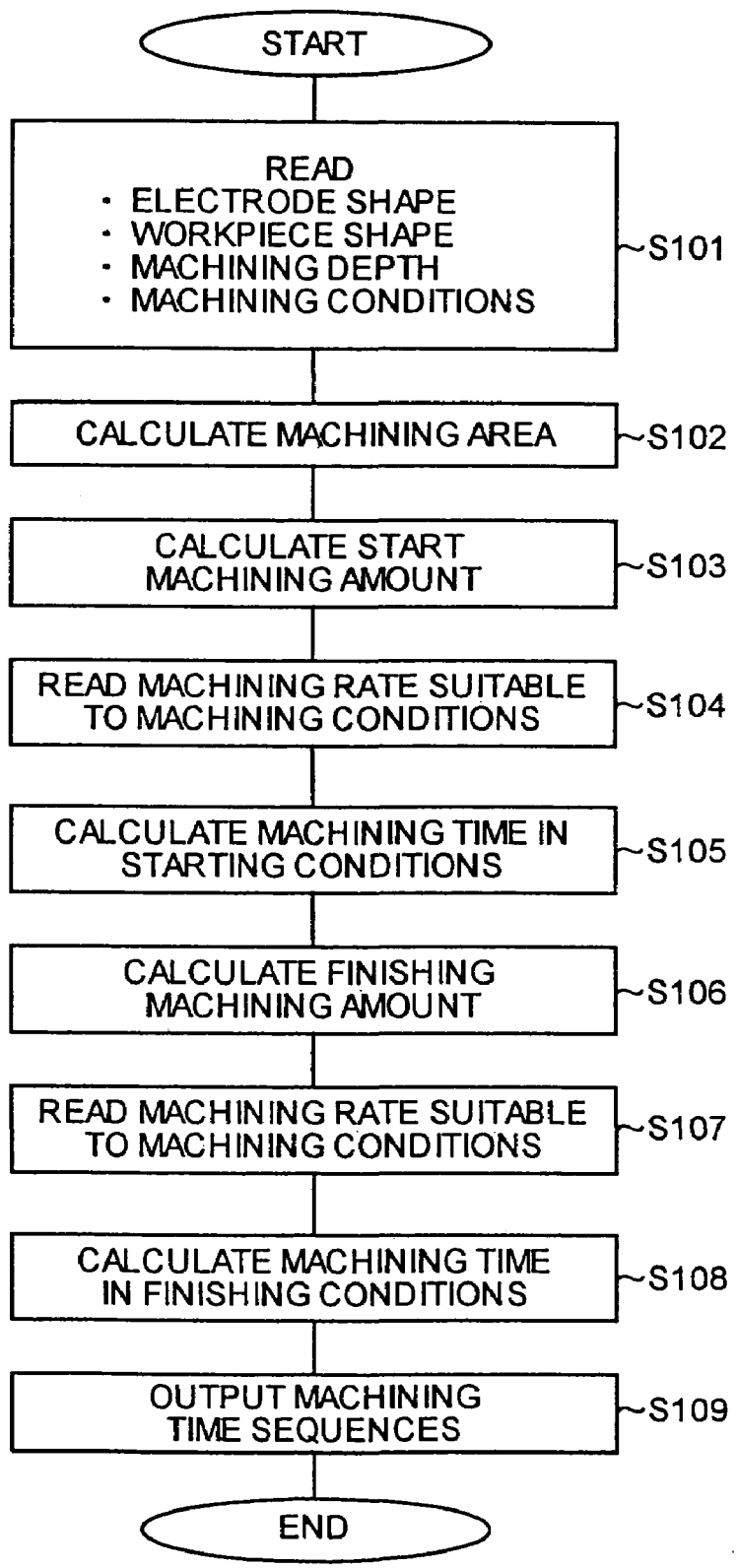
FIG. 5 is a flow chart of a method for estimating discharge time in the first embodiment.

FIG. 5 is a flow chart of a method for estimating the discharge time in the first embodiment.

The input section 11 first reads the user's required specifications for the discharge machining (step S101). The input section 11 reads, as the required specifications, data including an electrode shape a1$a$ that is a shape of the electrode 2 expressed three-dimensionally, i.e., expressed by a three-dimensional model, a workpiece shape a2$a$ that is a shape of the workpiece 8 expressed three-dimensionally, i.e., expressed by a three-dimensional model, the machining depth a3, and the machining conditions a4.

The machining area calculation section 12 calculates the machining area based on the required specifications read by the input section 11 (step S102). A machining area calculation method will be explained concretely.

Figure 6:
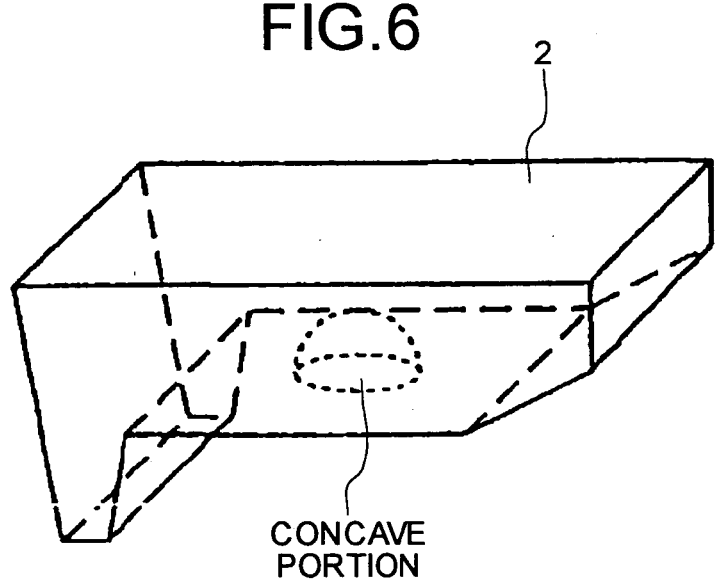
FIG. 6 is a perspective view of an electrode.

It is assumed herein that the three-dimensional electrode shape of the electrode 2 and the three-dimensional workpiece shape of the workpiece 8 are expressed by XYZ meshes. One example of expressing the three-dimensional electrode shape by meshes will be explained, while referring to the electrode having a shape as shown in FIG. 6.

Figure 7:
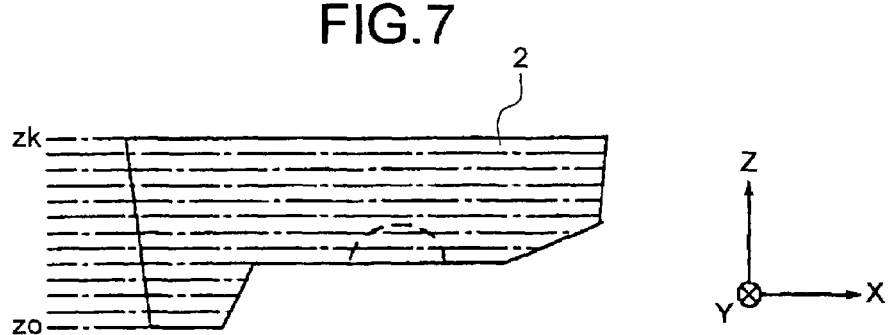
FIG. 7 an illustration which explains a state in which cross-sections of the electrode are extracted each by a predetermined division width in a Z-axis direction of a machining progress direction.

As shown in FIG. 7, (K+1) cross-sections of the electrode corresponding to Z0 to Zk each having a predetermined division width are expressed in a Z-axis direction of a machining progress direction. Each cross-section is preferably calculated per required size accuracy. However, if the number of divisions increases, the calculation causes an operation delay. Therefore, each cross-section may be calculated per reduced amount of the electrode or about one millimeter.

The cross-sectional shape in each machining direction is divided into small meshes. A mesh division width is preferably calculated per the required size accuracy. However, if the number of divisions increases, the calculation causes the operation delay. Therefore, the cross-sectional shape may be calculated per the reduced amount of the electrode or about one millimeter.

Figure 8C:
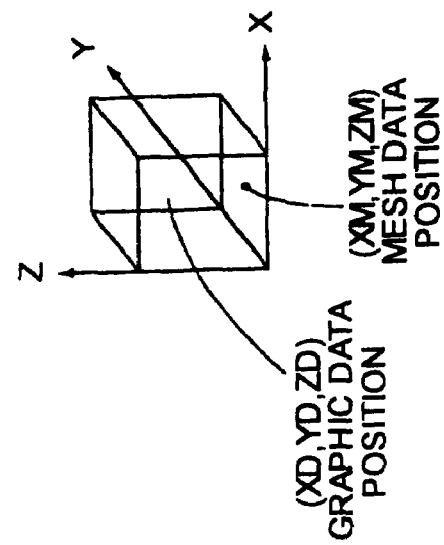
FIGS. 8A, 8B and 8C are to explain mesh division.
Figure 8B:
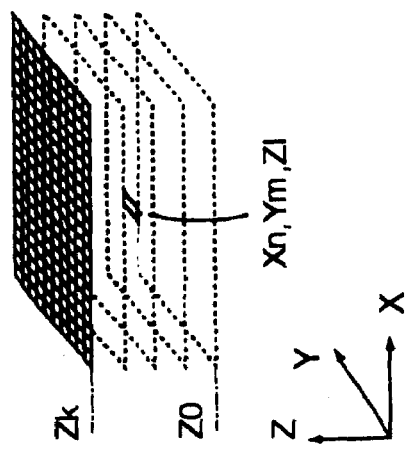
Figure 8A:
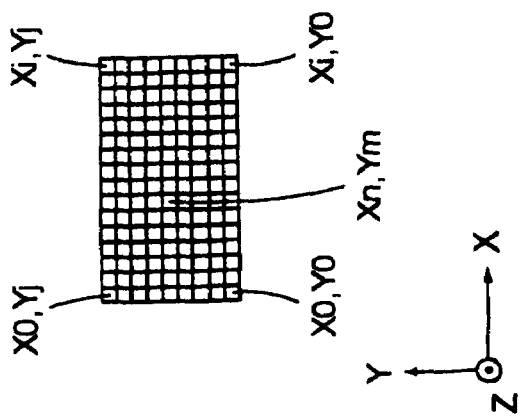

If the electrode is divided to (i+1) and (Y+1) in an X-axis direction and a Y-axis direction, respectively and a position coordinate of graphic data falls within the divided mesh shapes as shown in, for example, FIGS. 8A and 8B, the position coordinate (XD, YD, ZD) of the graphic data is changed to a position coordinate (XM, YM, ZM) of the mesh data as shown in FIG. 8B and information of, e.g., "1" is applied to indicate that the electrode is solid. If the electrode is hollow, the position coordinate of the graphic data does not fall within the divided mesh shapes. If so, information of, e.g., "0" is applied to indicate that the electrode is hollow.

As a result, mesh data on each divided element of (Xn, Ym, Zl) ($0 \leq n \leq i$, $0 \leq m \leq j$, $0 \leq l \leq k$, and n, m, and l are integers) can be obtained.

Accordingly, the electrode shape a1a of the three-dimensional electrode 2 and the workpiece shape a2a of the three-dimensional workpiece 8 can be expressed using the mesh data and the shapes of the electrode 2 and the workpiece 8 can be expressed by three-dimensional models.

A method of calculating the machining area using the mesh data thus obtained will be explained next. FIGS. 9A to 9C are views to explain the machining progresses how the machining area changes as the machining progresses. It is assumed here that the machining progresses in such a manner that the workpiece 8 is dug through. The positional relationship between the electrode 2 and the workpiece 8 changes in order of FIG. 9A→FIG. 9B→FIG. 9C. Accordingly, the machining area 25 becomes larger in order of FIG. 9A→FIG. 9B→FIG. 9C.

The machining area data section 13 calculates the machining area data as shown in FIG. 3 as follows.

Among the data on the electrode shape a1a and the workpiece shape a2a expressed by meshes, a dense data part is set at 1 and a non-data part is set at 0. To obtain a change in machining amount in each stage following the progress of machining, the electrode shape a1a is gradually moved down to a machining depth in a direction of the workpiece 8 by, for example, one millimeter apiece and the number of meshes of the cross-sections in a portion in which the electrode 2 overlaps with the workpiece 8 is counted. This operation is repeatedly performed down to a predetermined machining depth.

The machining area can be calculated by the following relational equation:

Machining area=(Number of effective meshes)×(size of one side of mesh)×(size of one side of mesh).

Consequently, the machining depths and the corresponding machining areas as shown in FIG. 3 can be calculated.

Thereafter, the machining amount calculation section 14 calculates a starting machining amount of the discharge machining from the machining area and machining depth thus obtained as well as an oscillation radius during the discharge machining (step S103). The starting machining amount can be calculated by the following relational equation:

Starting machining amount=Σ((machining depth for one step)×(area enlarged from machining area by oscillation radius)).

Figure 10:
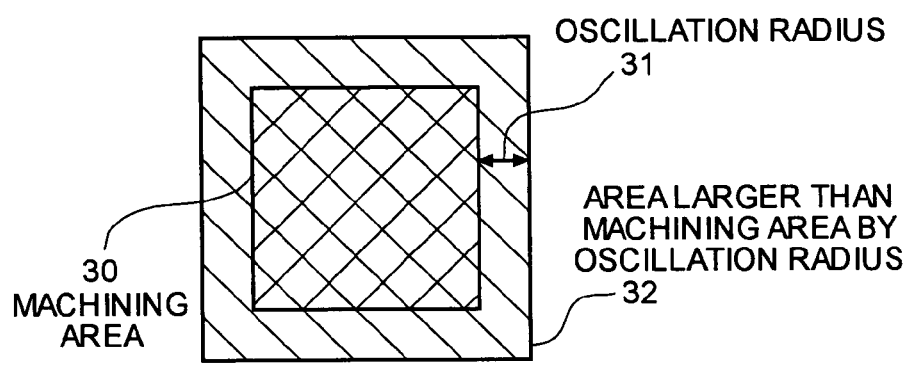
FIG. 10 is to explain increase in a machining area by an oscillation radius.

The "area enlarged from the machining area by the oscillation radius" will be explained. An example in which a bottom surface of the electrode, i.e., a machining surface that faces the workpiece 8 is generally a square having a side of ten millimeters as shown in FIG. 10 will be explained. An instance of machining the workpiece 8 having a flat workpiece surface using such an electrode 2 will be considered. In this instance, the entire bottom surface of the electrode 2 corresponds to the machining area and the machining area 30 is 10 mm×10 mm (=100 mm²).

The "area 32 enlarged from the machining area by the oscillation radius" in this example is calculated by adding the oscillation radius 31 of, for example, 0.1 millimeter to one side of ten millimeters. That is, the "area 32 enlarged from the machining area by the oscillation radius" is 10.2 mm×10.2 mm (=104.04 mm²).

The machining time calculation section 15 reads the machining rate per machining amount stored in the machining time data section 16 in advance as machining rate data satisfying each machining condition (step S104).

The machining time calculation section 15 calculates the machining time in predetermined machining starting conditions from the starting machining amount thus obtained and the machining rate read from the machining time data section 16 (step S105). The machining time can be calculated by the following relational equation:

Machining time=(step Starting machining amount)/(machining rate).

Through these steps, the machining time in the machining starting conditions estimated when the machining is performed according to the required specifications can be calculated.

With regard to finishing machining conditions required when finishing machining is performed, the machining amount calculation section 14 calculates a finishing machining amount per machining condition (step S106) similarly to the starting machining conditions. The machining time calculation section 15 reads, as machining rate data satisfying each finishing machining condition, the machining rate per machining amount stored in the machining time data section 16 in advance (step S107). The machining time calculation section 15 calculates the machining time in predetermined finishing conditions from the finishing machining amount thus obtained and the machining rate read from the machining time data section 16 (step S108).

Through these steps, the machining time in the finishing machining conditions estimated when the machining is performed according to the required specifications can be calculated.

Finally, based on these results, machining time sequences b1b to bmb in the starting machining conditions to the finishing conditions are set to the output section 17. The output section 17 outputs the machining time sequences b1b to bmb to the display device 18, whereby the machining time in each of the starting and finishing conditions thus obtained and total machining time can be displayed.

As explained so far, the electric discharge machining apparatus 100 expresses the shape of the electrode 2 and the shape of the workpiece 8 by the three-dimensional models, calculates the machining area per machining depth, and calculates the machining time.

Consequently, even if the machining area changes according to the shape of the electrode 2 as the discharge machining progresses, the machining time can be calculated according to machining status, i.e., according to a change in machining area.

Further, the shape of the electrode 2 and the shape of the workpiece 8 are expressed by the three-dimensional models. Therefore, the shape of the electrode 2 and that of the workpiece 8 can be accurately grasped as data and the data can be reflected in the machining time. The change in machining area following the progress of the machining can be thereby accurately grasped according to an actual machining state. In addition, since the machining volume is obtained based on this machining area change, the machining time can be calculated in light of the actual machining state.

Further, the shape of the workpiece 8 can be accurately grasped as the data and the data can be reflected in the machining time. Therefore, even if the discharge machining is performed to the workpiece 8 which has been subjected to predetermined premachining, the machining time can be calculated in light of the initial machining shape.

Hence, the electric discharge machining apparatus 100 can accurately estimate the machining time even if the electrode 2 and the workpiece 8 are complex in shape.

A modification of the electric discharge machining apparatus 100 will be explained next. In the first embodiment, the data on the shape of the electrode 2 and that on the shape of the workpiece 8 are input, as the required specifications, to the machining time estimation device and the machining area and the machining depth are calculated in the machining time estimation device. Alternatively, the data on the machining area change and the data on the machining depth following the progress of the machining obtained similarly in advance can be input as data to the machining time estimation device.

Namely, the machining time estimation device can include the input section that receives the data on the machining area change following the progress of the machining and the data on the machining depth, the machining amount calculation section that calculates the machining amount removed from the workpiece by the discharge machining, the machining time calculation section that operates the machining time required as the discharge time from the data on the machining area change following the progress of the machining and the data on the machining depth, the machining time data section that stores the machining rate data per machining amount necessary to calculate the machining time by the machining time calculation section, and the output section that outputs the machining time calculated by the machining time calculation section.

Even with such modification, even if the electrode and the workpiece are complex in shape, the machining time can be accurately estimated.

Furthermore, as the data input to the machining time estimation data, any data can be used besides the machining area and the machining depth as long as the data can express the machining amount.

According to the present invention, the machining time estimation device may be provided in an electric discharge machining apparatus main body or independently of the main body, e.g., on a personal computer.

Furthermore, to calculate the machining amount, the machining area is calculated first and then the machining area is enlarged by the oscillation radius in this embodiment. Alternatively, not the machining area but the machining cross-sectional shape can be enlarged by the oscillation radius and the area of the machining cross-sectional shape enlarged by the oscillation radius can be obtained. This enables estimating the machining time more accurately. In this case, the machining area depends on each machining condition. Further, a reduction margin and a contraction amount instead of the oscillation radius can be used. An NC program can be input instead of inputting the machining depth.

Although a discharge gap is not taken into account, more accurate estimation of the machining time will become possible if the discharge gap is taken into account.

Figure 11:
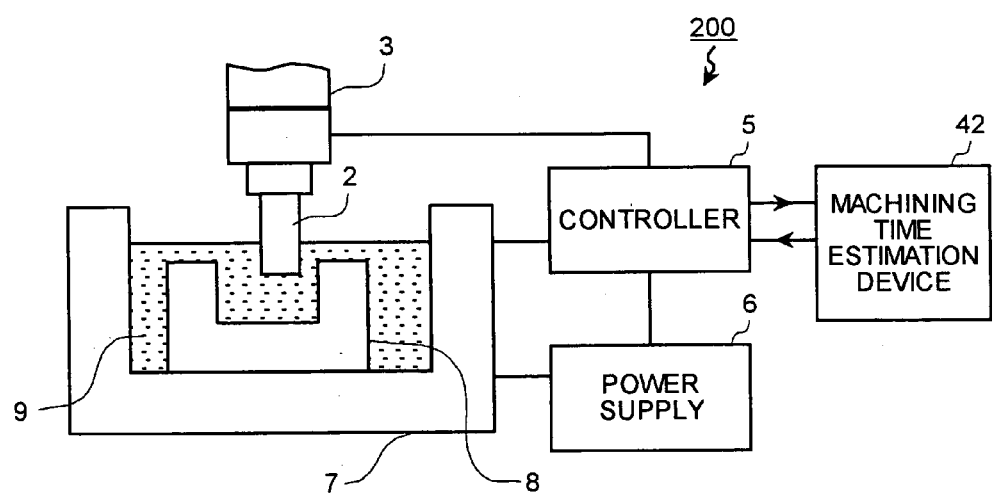
FIG. 11 is a schematic block diagram of an electric discharge machining apparatus according to a second embodiment of the present invention.

FIG. 11 is a block diagram of an electric discharge machining apparatus 200 according to a second embodiment of the present invention. To facilitate understanding, the same members as those in FIG. 1 are denoted by the same reference symbols, respectively in FIG. 11 and they will not be explained herein in detail.

The electric discharge machining apparatus 200 includes the electrode 2, the main shaft 3 serving as the head of the electric discharge machining apparatus, a machining time estimation device 42, the controller 5 which appropriately drives and controls the movement of the main shaft based on machining time set by the machining time estimation device 42, and the power supply 6. The electric discharge machining apparatus 200 includes, as the electrode, an electrode of electrode shape a1$a$ expressed by a three-dimensional model and an electrode of electrode shape a1$aa$ expressed by a three-dimensional model. The apparatus 200 performs electric discharge machining using the two types of electrodes.

The electrode 2 and a workpiece 8 are arranged to face each other while they are dipped in the machining solution 9 in the machining bath 7, and the predetermined pulse current is applied to the electrode 2 and the workpiece 8 from the power supply 6. By applying the current, intermittent discharge occurs to the machining gap between the electrode 2 and the workpiece 8 and the workpiece 8 is machined by the discharge.

Figure 12:
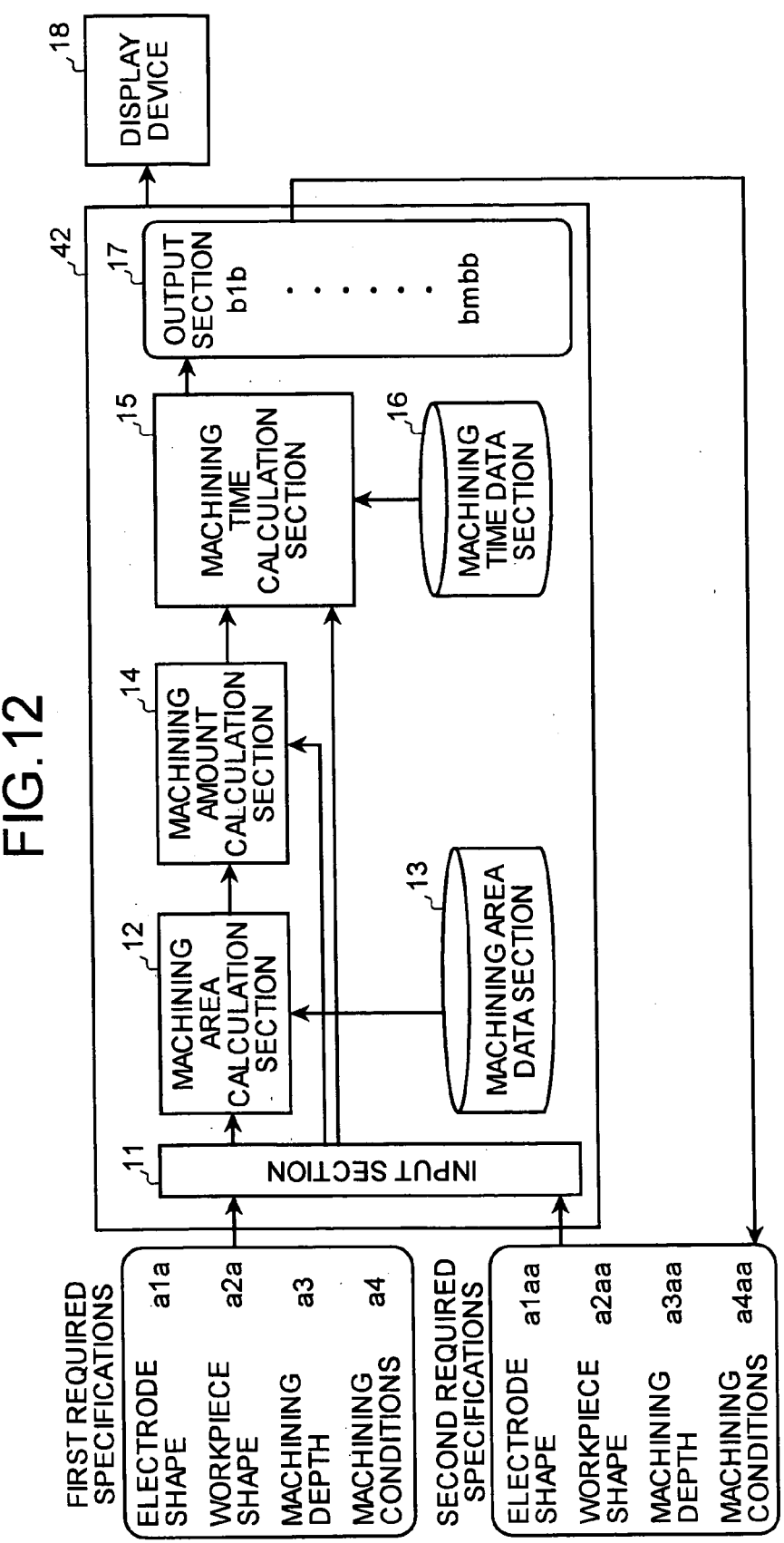
FIG. 12 is a block diagram of a machining time estimation device according to the second embodiment.

FIG. 12 is a block diagram of the machining time estimation device 42. The machining time estimation device 42 includes the input section 11 which receives required specifications from the user, the machining area calculation section 12 which operates a change in machining area following the progress of the discharge machining, the machining area data section 13 which stores machining depths and machining areas according to the required specifications in pairs, the machining amount calculation section 14 which calculates a change in machining volume that is a change in a machining amount removed from the workpiece 8 by the discharge machining based on the change in machining area obtained by the machining area calculation section 12, the machining time calculation section 15 which operates the machining time required as discharge time based on the change in machining volume obtained by the machining amount calculation section 14 and machining rate data per machining amount, the machining time data section 16 which stores the machining rate data per machining amount necessary to calculate the machining time in the machining time calculation section 15, and the output section 17 which outputs the machining time calculated by the machining time calculation section 15. The display device 18 which displays data output from the output section 17 is connected to the output section 17.

The machining area data section 13 stores machining depths and machining areas corresponding to the machining depths in the data table shown in, for example, FIG. 3. The machining time data section 16 stores detailed machining conditions and machining rates according to the required specifications in pairs in the data table shown in, for example, FIG. 4.

Figure 13:
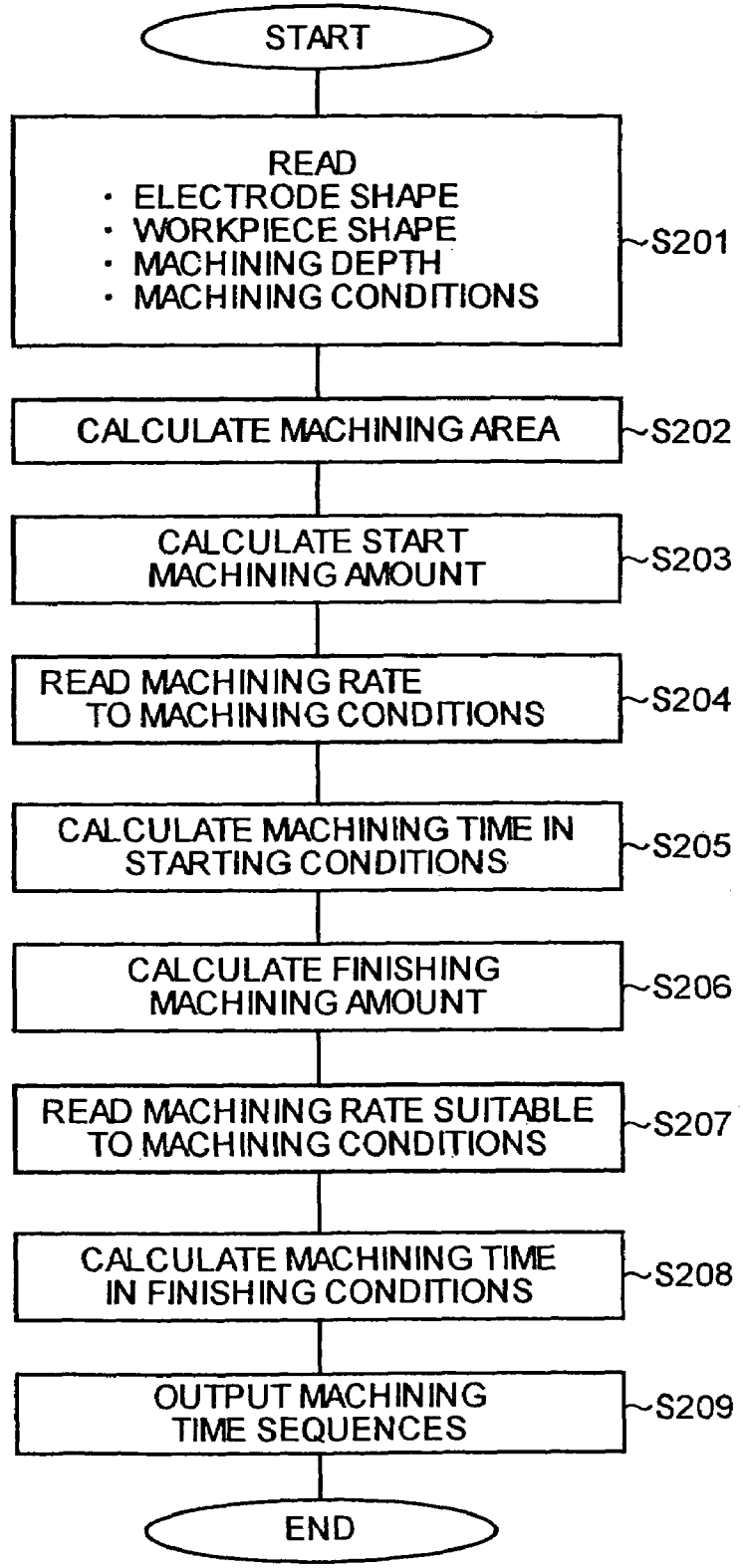
FIG. 13 is a flow chart of a method for estimating the electric discharge time in the second embodiment.

FIG. 13 is a flow chart of a method for estimating the discharge time in the second embodiment.

The input section 11 first reads the user's first required specifications for the discharge machining (step S201). The input section 11 reads, as the first required specifications, the electrode shape a1*a* that is the shape of the electrode 2 expressed by a three-dimensional model, the workpiece shape a2*a* that is the shape of the workpiece 8 expressed by a three-dimensional model, the machining depth a3, and the machining conditions a4.

Similarly to the first embodiment, the machining area calculation section 12 calculates the machining area based on the first required specifications read by the input section 11 (step S202).

The machining amount calculation section 14 calculates the starting machining amount of the discharge machining from the machining area and machining depth thus obtained as well as the oscillation radius during the discharge machining, similarly to the first embodiment (step S203).

The machining time calculation section 15 reads the machining rate per machining amount stored in the machining time data section 16 in advance as the machining rate data satisfying each machining condition (step S204).

The machining time calculation section 15 calculates the machining time in predetermined machining starting conditions from the starting machining amount thus obtained and the machining rate read from the machining time data section 16 (step S205).

With regard to finishing machining conditions required when finishing machining is performed, the machining amount calculation section 14 calculates the finishing machining amount per machining condition (step S206) similarly to the starting machining conditions. The machining time calculation section 15 reads, as machining rate data satisfying each finishing machining condition, the machining rate per machining amount stored in the machining time data section 16 in advance (step S207). The machining time calculation section 15 calculates the machining time in predetermined finishing conditions from the finishing machining amount thus obtained and the machining rate read from the machining time data section 16 (step S208).

Through these steps, the machining time in the finishing machining conditions estimated when the machining is performed according to the first required specifications can be calculated.

Based on these results, the machining time sequences b1*b* to bmb in the starting machining conditions to the finishing conditions are set to the output section 17. Further, the shape of the workpiece 8 after being machined using the electrode having the electrode shape a1*a* is set at a2*aa* and stored in a memory provided in the output section 17.

The input section 11 reads the user's other, second required specifications for the discharge machining (step S202). The input section 11 reads, as the second required specifications, the electrode shape a1*aa* that is the shape of the electrode 2 expressed by a three-dimensional model, the workpiece shape a2*a* that is the shape of the workpiece 8 expressed by a three-dimensional model, the machining depth a3*aa*, and the machining conditions a4*aa*. The steps of procedures (step S201) to (step S209) are repeated, thereby calculating the machining time in the machining starting conditions to the finishing conditions.

Through these steps, the machining time under the finishing machining conditions estimated when the machining according to the two types of the second different required specifications is performed, i.e., the machining is performed using the two types of different electrodes 2 can be calculated.

Finally, based on these results, machining time sequences b1*bb* to bmbb in the machining starting conditions to the finishing machining conditions are calculated and set to the output section 17. The output section 17 outputs the machining time sequences b1*bb* to bmbb and the machining time sequences b1*b* to bmb calculated first to the display section 18, whereby the machining time in each of the starting and finishing conditions thus obtained and total machining time can be displayed.

As explained so far, the electric discharge machining apparatus 200 expresses the shapes of the electrodes 2 and the shape of the workpiece 8 by the three-dimensional models, calculates the machining area per machining depth, and calculates the machining time.

Consequently, even if the machining area changes according to the shapes of the electrodes 2 as the discharge machining progresses, the machining time can be calculated according to machining status, i.e., according to a change in machining area.

Further, the shapes of the electrodes 2 and the shape of the workpiece 8 are expressed by the three-dimensional models. Therefore, the shapes of the electrodes 2 and that of the workpiece 8 can be accurately grasped as data and the data can be reflected in the machining time. The change in machining area following the progress of the machining can be thereby accurately grasped according to an actual machining state. In addition, since the machining volume is obtained based on this machining area change, the machining time can be calculated in light of the actual machining state.

Further, the shape of the workpiece 8 can be accurately grasped as the data and the data can be reflected in the machining time. Therefore, even if the discharge machining is performed to the workpiece 8 which has been subjected to predetermined premachining, the machining time can be calculated in light of the initial machining shape.

Hence, the electric discharge machining apparatus 200 can accurately estimate the machining time even if the electrodes 2 and the workpiece 8 are complex in shape.

The electric discharge machining apparatus 200 can calculate the machining time even if the machining is performed using two types of different electrodes by reading two types of different required specifications and calculating the machining time. Therefore, even if electric discharge machining is performed using the different electrodes 2 complex in shape, this electric discharge machining apparatus 200 can accurately estimate the machining time.

Moreover, in the second embodiment, the example of providing two types of required specifications has been explained. However, according to the present invention, the number of types of required specifications is not limited to two but three or more types of them can be set. Namely, the number of types of electrodes employed for the discharge machining is not limited to two. Even if three or more types of electrodes are employed, the machining time can be calculated. In this case, similarly to the second embodiment, the machining time can be estimated according to the machining progress status and accurately. Therefore, even if the electric discharge machining is continuously performed using a plurality of electrodes having different shapes and the final shape of the workpiece is formed, the accurate machining time can be estimated.

Although a discharge gap is not taken into account, more accurate estimation of the machining time will become possible if the discharge gap is taken into account.

Figure 14:
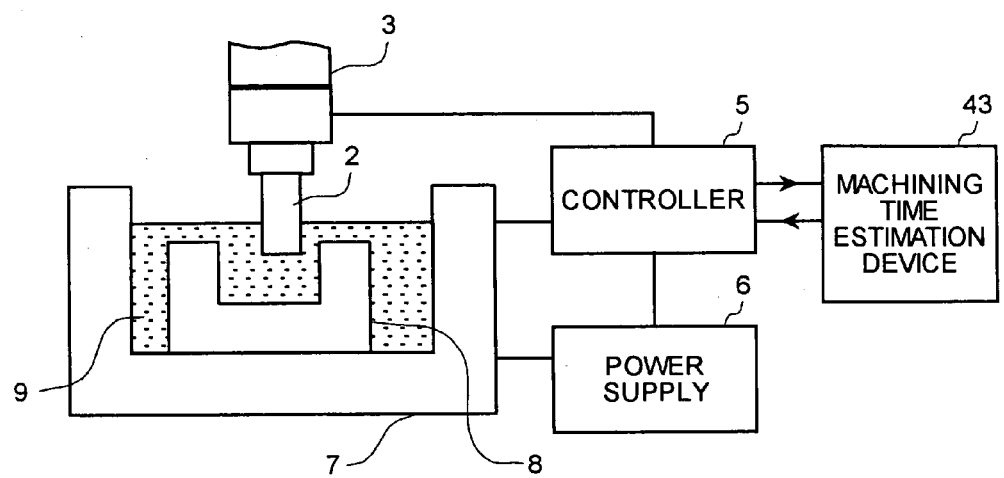
FIG. 14 is a schematic block diagram of an electric discharge machining apparatus according to a third embodiment of the present invention.

FIG. 14 is a block diagram of an electric discharge machining apparatus 300 according to a third embodiment of the present invention. To facilitate understanding, the same members as those in FIG. 1 are denoted by the same reference symbols, respectively in FIG. 14 and they will not be explained herein in detail.

The electric discharge machining apparatus 300 includes the electrode 2, the main shaft 3 serving as the head of the electric discharge machining apparatus, a machining time estimation device 43, the controller 5 which appropriately drives and controls the movement of the main shaft based on machining time set by the machining time estimation device 43, and the power supply 6.

The electrode 2 and a workpiece 8 are arranged to face each other while they are dipped in the machining solution 9 in the machining bath 7, and the predetermined pulse current is applied to the electrode 2 and the workpiece 8 from the power supply 6. By applying the current, intermittent discharge occurs to the machining gap between the electrode 2 and the workpiece 8 and the workpiece 8 is machined by the discharge.

Figure 15:
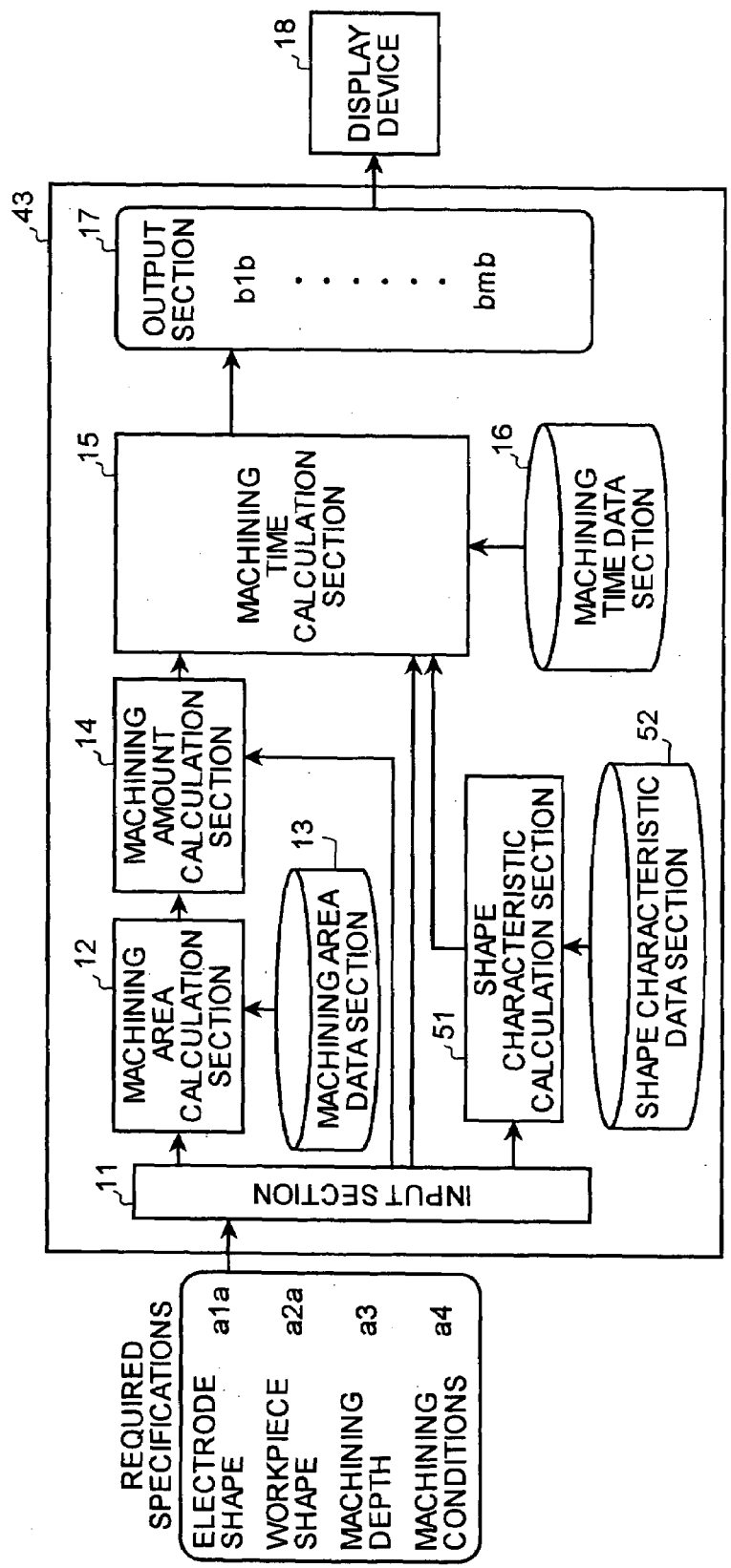
FIG. 15 is a block diagram of a machining time estimation device according to the third embodiment.

FIG. 15 is a block diagram of the machining time estimation device 43. The machining time estimation device 43 includes the input section 11 which receives required specifications from the user, the machining area calculation section 12 which operates a change in machining area following the progress of the discharge machining, the machining area data section 13 which stores machining depths and machining areas according to the required specifications in pairs, the machining amount calculation section 14 which calculates a change in machining volume that is a change in a machining amount removed from the workpiece 8 by the discharge machining based on the change in machining area obtained by the machining area calculation section 12, the machining time calculation section 15 which operates the machining time required as discharge time based on the change in machining volume obtained by the machining amount calculation section 14 and machining rate data per machining amount, the machining time data section 16 which stores the machining rate data per machining amount necessary to calculate the machining time in the machining time calculation section 15, the output section 17 which outputs the machining time calculated by the machining time calculation section 15, and the display device 18.

The machining area data section 13 stores machining depths and machining areas corresponding to the machining depths in the data table shown in, for example, FIG. 3. The machining time data section 16 stores detailed machining conditions and machining rates according to the required specifications in pairs in the data table shown in, for example, FIG. 4.

The machining time estimation device 43 also includes a shape characteristic data section 52 and a shape characteristic calculation section 51. The shape characteristic calculation section 51 calculates shape characteristic of the electrode 2. The shape characteristic data section 52 stores shape characteristics shown in the required specifications in advance and shape characteristic factors corresponding to the shape characteristics in pairs in the data table shown in, for example, FIG. 16.

The shape characteristic represents the characteristic of the shape that influences on the machining rate. FIGS. 17A to 17D are longitudinal sectional views of electrode 2. The electrode 2 may have various shapes such as a shape having a generally square longitudinal section FIG. 17A), a shape having a generally rectangular longitudinal section FIG. 17B), a shape having a generally rectangular longitudinal section and a concave portion formed in a machining surface FIG. 17C), and a shape having a generally rectangular longitudinal section long sideways FIG. 17D). Moreover, the amount of machining dusts 61 deposited in a gap between the electrode 2 and the workpiece 8 changes depending on the shape of the electrode 2, which change is another factor that influences on the machining rate.

Figure 18:
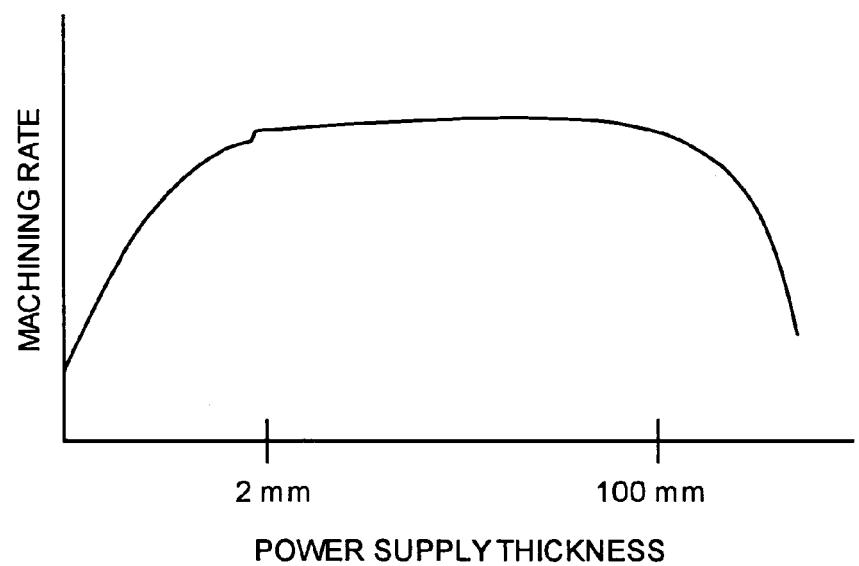
FIG. 18 is a graph of electrode thickness and machining time.

The electrode shape influences on the machining rate. FIG. 18 is a graph of thickness of the electrode against the machining time. All the machining conditions other than the thickness of the electrode are the same. As shown in FIG. 18, depending on the difference of the thickness of the electrode, the machining rate changes even if the other machining conditions are the same.

Therefore, the shape characteristic data section 52 stores the shape characteristics while designating each shape characteristic that influences on the machining rate such that if the shape is characterized in that "the thickness of the electrode is two millimeters or less and the machining depth is five millimeters or more", the shape characteristic factor is "C1", and so that if the shape is characterized in that "there is a hole right in the middle of the electrode", the shape characteristic factor is "C2". The shape characteristic factors are defined, as correction factors for correcting the machining time, so as to correspond to the respective shape characteristics. That is, by calculating the machining time using the shape characteristic factor, it is possible to calculate the machining time while considering and correcting the influence of the electrode shape on the machining rate. Accordingly, even if the machining is performed using the electrode of characteristic electrode shape that influences on the machining rate, more accurate machining time can be calculated.

Figure 19:
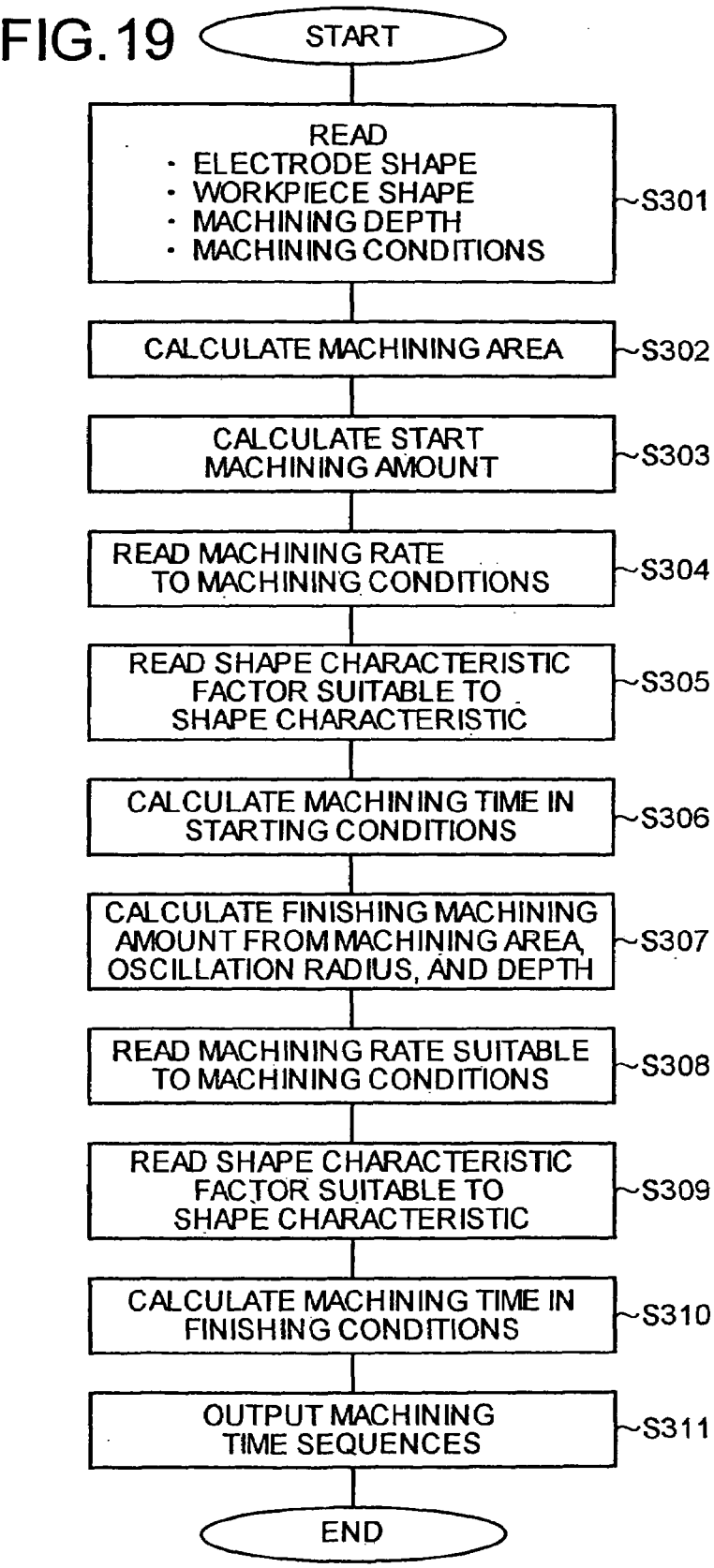
FIG. 19 is a flow chart of a method for estimating a discharge time in the third embodiment.

FIG. 19 is a flow chart of a method for estimating a discharge time in the third embodiment.

The input section 11 first reads the user's required specifications for the discharge machining (step S301). The input section 11 reads, as the required specifications, the electrode shape a1a that is the shape of the electrode 2 expressed by a three-dimensional model, the workpiece shape a2a that is the shape of the workpiece 8 expressed by a three-dimensional model, the machining depth a3, and the machining conditions a4.

Similarly to the first embodiment, the machining area calculation section 12 calculates the machining area based on the required specifications read by the input section 11 (step S302).

The machining amount calculation section 14 calculates the starting machining amount of the discharge machining from the machining area and machining depth thus obtained as well as the oscillation radius during the discharge machining, similarly to the first embodiment (step S303).

The machining time calculation section 15 reads the machining rate per machining amount stored in the machining time data section 16 in advance as the machining rate data satisfying each machining condition (step S304).

The machining time calculation section 15 reads the shape characteristic factor data obtained by the shape characteristic calculation section 51 and stored in the shape characteristic data section 52 (step S305). At this step, based on the data input to the input section in advance, the characteristic of the shape of the electrode 2 is extracted. The shape characteristic corresponding to the characteristic of the shape and a correction factor corresponding to the shape characteristic, i.e., the shape characteristic factor are extracted.

The machining time calculation section 15 calculates the machining time in machining starting conditions estimated for the required specifications from the starting machining amount, the machining rate, and the shape characteristic factor (step S306). The machining time calculation section 15 calculates temporary machining time based on the starting machining amount and the machining rate, and calculates accurate machining time by correcting the temporary machining time using the shape characteristic factor. By using the shape characteristic factor, the machining time can be calculated while considering and correcting the influence of the characteristic electrode shape on the machining rate. The machining time in the machining starting conditions can be calculated by the following equation:

Starting machining time=(Temporary starting machining time)×(shape characteristic factor).

With regard to finishing machining conditions required when finishing machining is performed, the machining amount calculation section 14 calculates the finishing machining amount per machining condition (step S307) similarly to the starting machining conditions. The machining time calculation section 15 reads, as machining rate data satisfying each finishing machining condition, the machining rate per machining amount stored in the machining time data section 16 in advance (step S308).

The machining time calculation section 15 reads the shape characteristic factor data obtained by the shape characteristic calculation section 51 and stored in the shape characteristic data section 52 in advance (step S309). At this step, based on the data input to the input section in advance, the characteristic of the shape of the electrode 2 is extracted. In addition, the shape characteristic corresponding to the characteristic of the shape and the correction factor corresponding to the shape characteristic, i.e., the shape characteristic factor are extracted.

Further, the machining time calculation section 15 calculates the machining time in the finishing machining conditions estimated for the required specifications from the finishing machining amount, the machining rate, and the shape characteristic factor thus obtained (step S306). The machining time calculation section 15 calculates temporary machining time based on the starting machining amount and the machining rate, and calculates accurate machining time by correcting the temporary machining time using the shape characteristic factor. By using the shape characteristic factor, the machining time can be calculated while considering and correcting the influence of the characteristic electrode shape on the machining rate. The machining time in the machining starting conditions can be calculated by the following equation used to calculate the machining time in the machining starting conditions.

Through these steps, the machining time in the finishing machining conditions estimated when the machining is performed according to the required specifications can be calculated.

Finally, based on these results, the machining time sequences b1b to bmb in the starting machining conditions to the finishing conditions are set to the output section 17. The output section 17 outputs the machining time sequences b1bb to bmb to the display section 18, whereby the machining time in each of the starting and finishing conditions thus obtained and total machining time can be displayed.

While FIG. 15 illustrates that only one type of required specification is provided, two types of required specifications may be provided similarly to the second embodiment or three or more may be provided.

Figure 20:
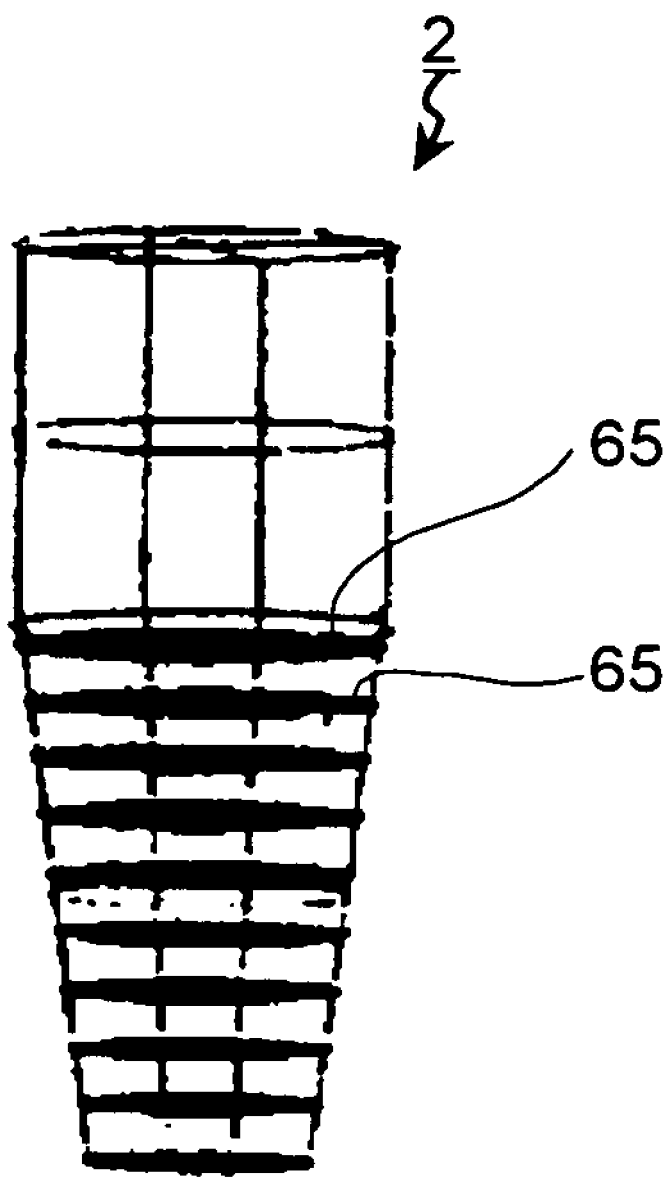
FIG. 20 illustrates one example in which the electrode is divided to cross sections.

The electrode shape feature can be extracted by the following method. The method of extracting the electrode shape characteristic will be explained next. To extract the electrode shape characteristic, cross-sections of the electrode 2 in a direction perpendicular to the machining progress direction are extracted first. As shown in FIG. 20, for example, cross-sections obtained by dividing the electrode 10 into ten each by a predetermined machining depth in the machining progress direction are extracted. The cross-sectional shapes are expressed by XYZ meshes similarly to the first embodiment to recognize the shape of the electrode. After recognizing the electrode shape, the shape characteristic of the electrode is extracted as follows.

(Outline Extraction)

An outline of the electrode can be extracted as follows:

(1) As shown in FIG. 21A, in the meshes expressing the cross-sectional shape, dense data parts are allocated "1" and non-data parts are allocated "0". FIG. 21A illustrates an example in which a hole is formed in the middle.

(2) Parts changing from 0 to 1 are searched sequentially from an end and the searched parts are set as outline extraction start points, respectively. The start points are changed from 1 to outline number 2, respectively.

(3) Adjacent outline parts (parts changing from 0 to 1) are searched and the data of the searched parts are changed from "1" to "2".

(4) The step of procedure (3) is repeated until no next outline part is present and data 2 appears, whereby the outline can be extracted.

(5) The outline number of each outline part is implemented to 3 and the steps of procedures (2) to (4) are repeatedly carried out.

(6) The steps of procedures (1) to (5) are repeated until no outline extraction start points are present. "(final outline number)−1" is the number of outlines.

It is then necessary to discriminate whether the extracted outline is an external outline or a hole. If there are many external outlines, the electrode shape is, for example, a shape of a multiple rib. In addition, "the number of outlines=the number of external outlines+the number of holes". Whether the extracted outline is an external outline or a hole can be determined as follows: (1) in [i, Y coordinate of the center of the outline to be discriminated] (i=0, 1, 2, . . .), i which corresponds to a to-be-discriminated outline number is searched. If "i+1" is 0, the outline is discriminated as "external outline" and if "i+1" is 0, the outline is discriminated as "hole". In this example, as shown in FIG. 21B, the outline number 2 indicates the external outline and the outline number 3 indicates the hole.

The thickness of the electrode can be calculated by the following method: (1) As shown in FIG. 21C, the outline number of each part the thickness of which is to be calculated is changed to 0 and the outline is extracted again.

(2) The step of procedure (1) is repeated and when the outline cannot be extracted, the thickness can be calculated by the following relational equation:

Thickness=(Number of times of repetition)×2×(size of one side of mesh).

With these methods, the shape characteristic of the electrode 2 can be extracted.

As explained so far, the electric discharge machining apparatus 300 expresses the shape of the electrode 2 and the shape of the workpiece 8 by the three-dimensional models, calculates the machining area per machining depth, and calculates the machining time.

Consequently, even if the machining area changes with the shape of the electrode 2 as the discharge machining progresses, the machining time can be calculated according to machining status, i.e., according to a change in machining area.

Further, the shape of the electrode 2 and the shape of the workpiece 8 are expressed by the three-dimensional models. Therefore, the shape of the electrode 2 and that of the workpiece 8 can be accurately known as data and the data can be reflected in the machining time. The change in machining area following the progress of the machining can be thereby accurately grasped according to an actual machining state. In addition, since the machining volume is obtained based on this machining area change, the machining time can be calculated in light of the actual machining state.

Furthermore, the shape of the workpiece 8 can be accurately grasped as the data and the data can be reflected in the machining time. Therefore, even if the discharge machining is performed to the workpiece 8 which has been subjected to predetermined premachining, the machining time can be calculated in light of the initial machining shape.

Hence, the electric discharge machining apparatus 300 can accurately estimate the machining time even if the electrode 2 and the workpiece 8 are complex in shape.

Moreover, the electric discharge machining apparatus 300 accurately extracts the characteristic of the shape of the electrode if the machining is performed using the electrode 2, makes corrections according to the extracted shape characteristic, and calculates the machining time. As a result, it is possible to calculate more accurate machining time according to the characteristics of the electrode shape in that, for example, the machining dusts tend to be deposited during the discharge machining as shown in FIG. 16, or the machining tends to be unstable.

Consequently, even if the machining conditions tend to change according to the shape of the electrode 2, the electric discharge machining apparatus 300 can accurately estimate the machining time.

In the embodiments explained above, the instance of calculating the machining area that changes as the machining progresses, calculating the machining volume based on the calculated machining area change, and calculating the machining time has been explained. However, the method of calculating the machining volume is not limited to the method based on the machining area, and changes and modifications can be made to the method within the scope of the present invention.

As explained so far, even if the machining area changes with the shape of the electrode as the discharge machining progresses, the electric discharge machining apparatus according to the present invention can calculate the machining time according to the machining status.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

The electric discharge machining apparatus according to the present invention is effective in estimating the machining time of the machining using the electrode of three-dimensionally complex shape, in particular, in estimating the machining time in conditions in which a discharge state tends to change during the machining because not only the electrode but also the workpiece is premachined and both the electrode and the workpiece are complex in shape.

The invention claimed is:

1. An electric discharge machining apparatus comprising:
    an input unit that receives input of data about three-dimensional shape of an electrode, three-dimensional shape of a workpiece, and machining conditions;
    a machining volume calculation unit that calculates, based on the data about the shape of the electrode, the shape of the workpiece, and the machining conditions, a machining volume that changes as machining of the workpiece by the electrode progresses;
    a machining time calculation unit that calculates, based on the machining volume calculated by the machining volume calculation unit, a machining time that is a time required to complete the machining of the workpiece by the electrode;
    an extraction unit that extracts a characteristic of the shape of the electrode that influences a machining rate;
    a correction unit that corrects the machining time according to the characteristic extracted by the extraction unit; and
    a display unit that displays the machining time calculated by the machining time calculation unit;
    wherein the extraction unit extracts a plurality of cross-sections of the electrode, divides the cross-sections to meshes, allocates solid or hollow mesh data to respective division elements, and extracts the characteristic of the electrode shape from the mesh data.

2. The electric discharge machining apparatus according to claim 1, wherein the data about the shape of the electrode includes data about shapes of a plurality of electrodes.

3. The electric discharge machining apparatus according to claim 1, wherein the correction unit corrects the machining time using a correction factor for correcting the machining time according to the characteristic extracted.

4. An electric discharge machining apparatus comprising:
    an input unit that receives input of data about three-dimensional shape of an electrode, three-dimensional shape of a workpiece, machining conditions, and machining depth;
    a machining area calculation unit that calculates, based on the data about the shape of the electrode, the shape of the workpiece, the machining conditions, and the machining depth, a machining area that changes as machining of the workpiece by the electrode progresses;
    a machining volume calculation unit that calculates a machining volume based on a change in the machining area calculated by the machining area calculation unit;
    a machining time calculation unit that calculates a machining time based on the machining volume calculated by the machining volume calculation unit;
    an extraction unit that extracts a characteristic of the shape of the electrode that influences a machining rate;

a correction unit that corrects the machining time according to the characteristic extracted by the extraction unit; and a display unit that displays the machining time calculated by the machining time calculation unit;

wherein the extraction unit extracts a plurality of cross-sections of the electrode, divides the cross-sections to meshes, allocates solid or hollow mesh data to respective division elements, and extracts the characteristic of the electrode shape from the mesh data.

5. The electric discharge machining apparatus according to claim 4, wherein the data about the shape of the electrode includes data about shapes of a plurality of electrodes.

6. The electric discharge machining apparatus according to claim 4, wherein the correction unit corrects the machining time using a correction factor for correcting the machining time according to the characteristic extracted.

* * * * *